US012130572B2

(12) United States Patent
Shoshani et al.

(10) Patent No.: US 12,130,572 B2
(45) Date of Patent: Oct. 29, 2024

(54) DETERMINING THE EXISTENCE OF DEFECTS IN PRINT APPARATUSES

(71) Applicant: Hewlett-Packard Development Company, L.P., Spring, TX (US)

(72) Inventors: Asaf Shoshani, Nes Ziona (IL); Lavi Cohen, Nes Ziona (IL); Yaniv Yona, Nes Ziona (IL)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 0 days.

(21) Appl. No.: 18/248,811

(22) PCT Filed: Oct. 13, 2020

(86) PCT No.: PCT/US2020/055364

§ 371 (c)(1),
(2) Date: Apr. 12, 2023

(87) PCT Pub. No.: WO2022/081139

PCT Pub. Date: Apr. 21, 2022

(65) Prior Publication Data

US 2023/0418198 A1 Dec. 28, 2023

(51) Int. Cl.
*G03G 15/00* (2006.01)

(52) U.S. Cl.
CPC ..... *G03G 15/5037* (2013.01); *G03G 15/5054* (2013.01); *G03G 15/75* (2013.01)

(58) Field of Classification Search
USPC ........................................................ 399/48
See application file for complete search history.

(56) References Cited

U.S. PATENT DOCUMENTS 5,448,337 A * 9/1995 Williams .............. G01R 29/12
324/456
7,272,330 B2 9/2007 Harlan et al.
(Continued)

FOREIGN PATENT DOCUMENTS

JP 2018063364 A * 4/2018 .......... G03G 15/065
JP 6676922 B2 4/2020
(Continued)

*Primary Examiner* — Quana Grainger
(74) *Attorney, Agent, or Firm* — Jordan IP Law, LLC

(57) ABSTRACT

A print apparatus is disclosed. In an example, the print apparatus comprises: a photoconductive surface to receive a latent image representative of an image to be printed onto a printable substrate; a plurality of print components, each print component having a surface movable relative to the photoconductive surface, wherein a current or voltage is to be applied between the print component surface and the photoconductive surface; and processing circuitry to: measure a current or voltage between each print component surface and the photoconductive surface; responsive to detecting a deviation in the measured current or voltage from a reference current or voltage in respect of any of the plurality of print components, determine that there exists a defect associated with the photoconductive surface; and determine, based on the amount of deviation of the measured current or voltage from the reference current or voltage, an indication of the size of the defect.

14 Claims, 6 Drawing Sheets

(56) References Cited

U.S. PATENT DOCUMENTS

| | | | |
|---|---|---|---|
| 7,755,799 | B2 | 7/2010 | Paul et al. |
| 8,116,640 | B2 | 2/2012 | Zona et al. |
| 8,331,809 | B2 | 12/2012 | Lu et al. |
| 8,340,536 | B2 | 12/2012 | Paul et al. |
| 2011/0274452 | A1 | 11/2011 | Fukuyama et al. |
| 2014/0196623 | A1 | 7/2014 | Lopez et al. |

FOREIGN PATENT DOCUMENTS

| | | | | |
|---|---|---|---|---|
| JP | 2021196404 | A | * 12/2021 | ......... G03G 15/5025 |
| WO | 2019/022551 | A1 | 1/2019 | |

* cited by examiner

DETERMINING THE EXISTENCE OF DEFECTS IN PRINT APPARATUSES

BACKGROUND

One example of a printing technology that may be implemented in the field of printing is liquid electrophotography (LEP). LEP printing may involve interactions between a series of surfaces, such as the surfaces of rollers, to enable transfer of electrically-charged liquid ink via the rollers to a substrate.

If one the surfaces or rollers is defective, then a print quality defect may occur in an image printed on the substrate using the defective surface or roller.

BRIEF DESCRIPTION OF DRAWINGS

Examples will now be described, by way of non-limiting example, with reference to the accompanying drawings, in which.

DETAILED DESCRIPTION

Figure 1:
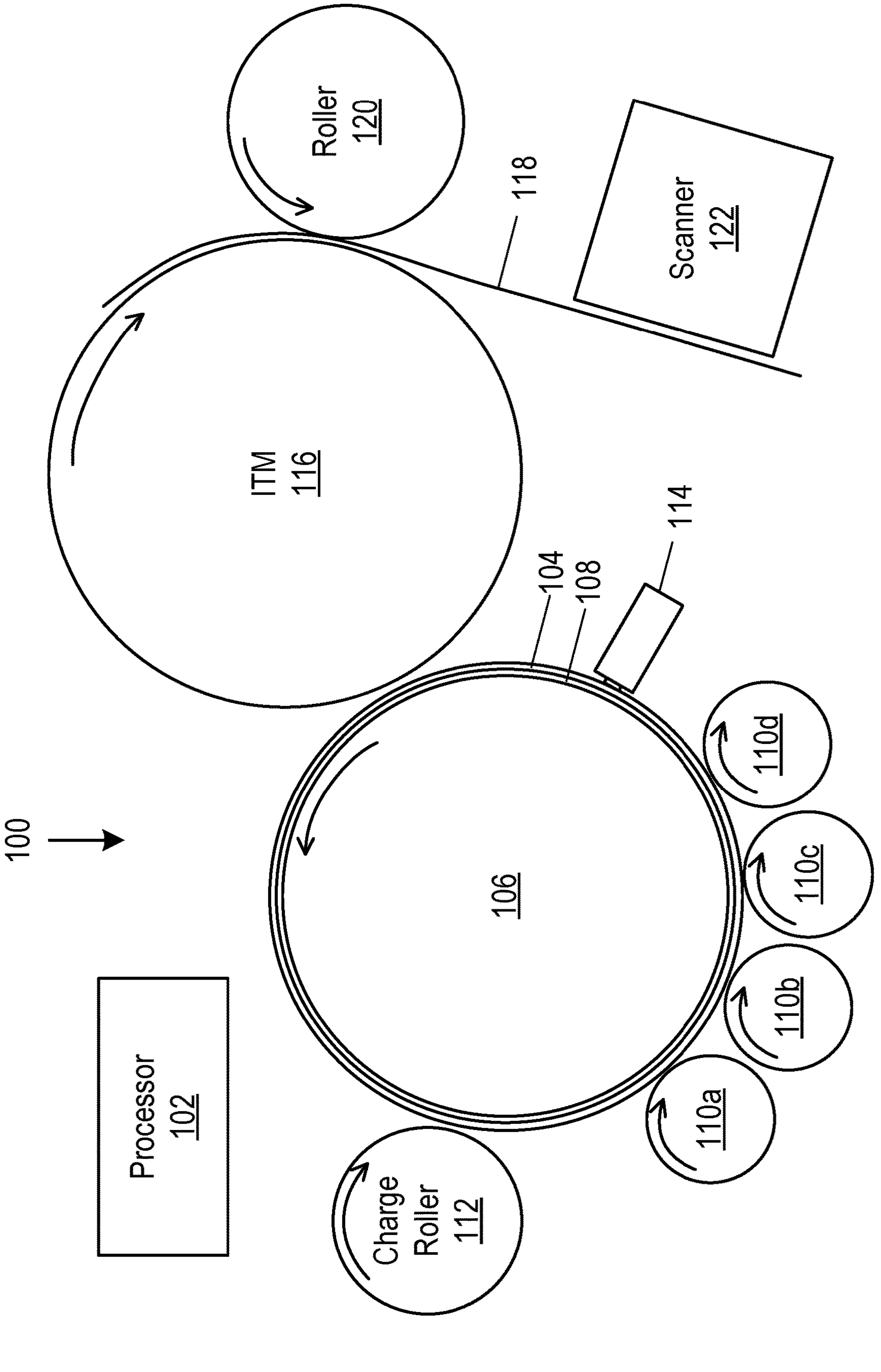
FIG. 1 is a schematic illustration of an example of a print apparatus.

Examples disclosed herein provide a mechanism by which a defect associated with a component of a print apparatus can be detected through its interaction with other components of the print apparatus. Moreover, examples of the present disclosure enable an indication of the size of the defect to be determined. Some examples also enable a location of the defect to be determined.

The present disclosure relates to various printing technologies. One example of a print apparatus in respect of which the present disclosure is relevant, is a liquid electrophotography (LEP) print apparatus. In a liquid electrophotography apparatus, print agent, such as ink, may pass through a print agent application assembly, such as a binary ink developer (BID). Each BID handles print agent of a particular color, so an LEP printing system may include, for example, four BIDs or seven BIDs, depending on the number of colors to be printed. Print agent from a BID is selectively transferred from a print agent transfer roller—also referred to as a developer roller—of the BID in a layer of substantially uniform thickness to a surface of a photoconductor, such as a photo imaging plate (PIP). During use, the PIP surface is electrostatically charged, and a writing head (e.g. a laser) is used to selectively discharge portions of the PIP surface to form a latent image representative of an image to be printed. The selective transfer of print agent is achieved through the use of an electrically-charged print agent, also referred to as a "liquid electrophotographic ink". As used herein, a "liquid electrophotographic ink" or "LEP ink" generally refers to an ink composition, in liquid form, generally suitable for use in a liquid electrostatic printing process, such as an LEP printing process. The LEP ink may include chargeable particles of a resin and a pigment/colorant dispersed in a liquid carrier.

The photoconductor onto which print agent is selectively transferred is, in some examples, a replaceable component. In some examples, the photoconductor may comprise a sheet, a flexible substrate (e.g. a belt) or a foil that is wrapped around a roller, a drum or a series of rollers. In some examples, the component around which the flexible photoconductor is formed or wrapped may include a compressible layer, sometimes referred to as a 'soft-sub' layer. In some examples, the whole component may be referred to as a photoconductor, and the photoconductor may have multiple layers. Over time, the photoconductor may become worn, leading to a reduction in the quality of printing that it is able to achieve. The photoconductor may then be removed and replaced with a new or different photoconductor.

In some cases, a print quality defect may occur in an image printed using the photoconductor as a result of a particular defect associated with the photoconductor. For example, a scratch in the surface of the photoconductor may affect the transfer of print agent, resulting in a print defect in the printed image. In another example, a contaminant, a foreign body or debris, such as a hair or dirt, may become trapped under the photoconductor, or under a layer of the photoconductor, such as between the soft-sub layer and the photoconductor. Such debris may cause a bump or ridge to form in the photoconductor, affecting an otherwise smooth photoconductor surface, and this may result in a print quality defect sometimes referred to as a 'star mark'. Such print quality defects can be avoided if the contaminant can be located and removed from beneath the photoconductor. However, if an operator of a print apparatus is not aware of the potential occurrence of such a defect, or cannot locate the contaminant, then the operator may unnecessarily remove and replace the photoconductor, resulting in an unnecessary waste of components, a waste of time reducing utilization of the print apparatus, and potentially increased costs for the consumer.

According to examples disclosed herein, potential defects may be detected by measuring a current or a voltage that is applied between various print components and the photoconductor as the photoconductor is moved relative to the print components. For example, a drum on which the photoconductor is mounted may be rotated relative to the various print components, and the current or voltage between the photoconductor and each print component is measured as the drum is rotated. As the drum rotates, the measured current or voltage remains relatively constant. However, if the measurement of the current or voltage shows a spike at a particular point during the drum rotation, then it may be determined that a defect (e.g. a contaminant or a scratch) exists on the photoconductor or under the photoconductor at a location corresponding to the spike.

Referring to the drawings, FIG. 1 is a simplified, schematic illustration of an example apparatus, such as a print apparatus 100. The print apparatus 100 may be an LEP print apparatus. The apparatus 100 includes a processor or processing circuitry 102 coupled to, and for controlling, various components of the print apparatus 100. The print apparatus 100 includes an imaging plate or photoconductor 104, such as a photographic imaging plate (PIP). The imaging plate 104 may, in some examples, comprise a substantially cylindrical roller having a photoconductive surface. In other examples, the imaging plate 104 may comprise a photoconductor (e.g. a photoconductive material having a photoconductive surface) formed on a drum or a roller 106. In the example shown in FIG. 1, an intermediate layer, known as a soft-sub layer 108 is located between the photoconductor 104 and the drum or roller 106. In some examples, the soft-sub layer 108 may comprise an inner layer of the photoconductor 104.

A plurality of print agent application assemblies, or binary ink developers (BIDs) are arranged around the photoconductor 104 and may be arranged such that a developer roller 110 of each BID is able to interact (i.e. transfer print agent to) the photoconductor. For clarity, in FIG. 1, just the developer roller 110*a*, 110*b*, 110*c*, 110*d* of each BID is shown. In the example shown, the print apparatus 100 includes four BIDs and each BID may store and transfer print agent of a particular color (e.g. cyan, magenta, yellow and black). In some examples, the print apparatus 100 may include seven BIDs while, in other examples, more or fewer BIDs may be included.

The print apparatus 100 also includes a charge roller 112 (e.g. a ceramic charge roller) to apply an electrostatic charge to the photoconductor 104. In some examples, the print apparatus 100 may also include an electrometer 114 to measure a change in capacitance with respect to the photoconductor 104 in order to measure a voltage at different positions over the photoconductor surface. It will be understood that the PIP drum/roller 106 has a length (and that the photoconductor 104 has a length which is the same or similar to that of the PIP drum/roller) and that the charge roller 112 and the electrometer 114 are sized appropriately to extend over the length of an imaging area of the photoconductor.

The print apparatus 100 shown in FIG. 1 also includes an intermediate transfer member (ITM) 116. The ITM 116 may, in some examples, comprise a substantially cylindrical roller or drum. The ITM 116 may include a print blanket (not shown) which, in some examples, may be replaceable. In other words, it may be intended that the print blanket is replaced by a new print blanket after a defined time or after a defined number of uses. The print blanket may, in some examples, comprise a flexible sheet wrapped and secured around the ITM 116, so as to receive print agent from the photoconductor 104.

A printable substrate 118, such as paper, for example, is brought into contact with the ITM 116. The printable substrate 118 may comprise a web substrate; in FIG. 1, however, only part of the printable substrate is shown. The substrate 118 may comprise a length of material onto which print agent may be transferred. Other rollers (such as the roller 120) may be provided to direct the substrate 118 through the print apparatus, and to apply tension to the substrate. As the substrate 118 is brought into contact with the ITM 116 (or the print blanket, where present), print agent from the ITM may be transferred onto the substrate in the form of the intended image. The print agent transferred onto the substrate may be fixed, for example by the application of heat and/or pressure. In the example shown, the PIP drum/roller 106, the developer rollers 110, the charge roller 112, the ITM 116 and the roller 120 are rotatable in the directions indicated by the arrows shown.

In some examples, a scanner 122 may be provided, either as part of the apparatus 100 or externally to the apparatus. The scanner 122 is to scan (e.g. capture an image of) the printable substrate after the substrate has passed the ITM 116 (e.g. after an image has been printed onto the printable substrate). The function of the scanner 122, which may be referred to as an in-line scanner or ILS, is discussed in greater detail below.

The processor 102 may be communicatively connected to any of the components of the print apparatus 100 discussed above. For example, the processor 102 may: control the feed of the printable substrate 118 through the print apparatus 100; operate the scanner 122 to capture an image of the printable substrate 118; operate the charge roller 112 to apply an electrostatic charge to the photoconductor 104; operate the BIDs to cause print agent to be transferred via the developer rollers 110 onto the photoconductor 104; and the like.

As noted above, some components of the print apparatus 100 interact with the photoconductor 104 during use, and these components can be used to measure a current and/or a voltage at various positions on the photoconductor. The developer roller 110 of each print agent application assembly (i.e. BID), the charge roller 112 and the electrometer 114 are examples of components that can be used to measure a current or a voltage on the photoconductor 104, and these components are referred to collectively as "print components" herein. In some examples, the processor 102 may apply, or may operate another component to apply, a current or a voltage (e.g. a constant or substantially constant current or a voltage) to the photoconductor 104 and or to one of the print components or to multiple print components. For example, during use, a first voltage may be applied to the developer roller 110*a* and a second voltage may be applied to the photoconductor 104. When the second voltage is different to the first voltage, a potential difference is created and, therefore a current flows between the developer roller 110*a* and the photoconductor 104. As the developer roller 110*a* and the photoconductor 104 move (e.g. rotate) relative to one another, the potential difference/current between the print component and the photoconductor may be measured and monitored. Thus, each of the plurality of print components 110, 112, 114 may be used to separately measure a current or voltage between the print component and different locations over the surface of the photoconductor 104 as it rotates relative to the print components. A spike or deviation (e.g. a deviation having a gradient exceeding a threshold) from the expected constant current or voltage indicates that a defect may exist associated with the photoconductor 104 and/or with the print component.

Figure 2:
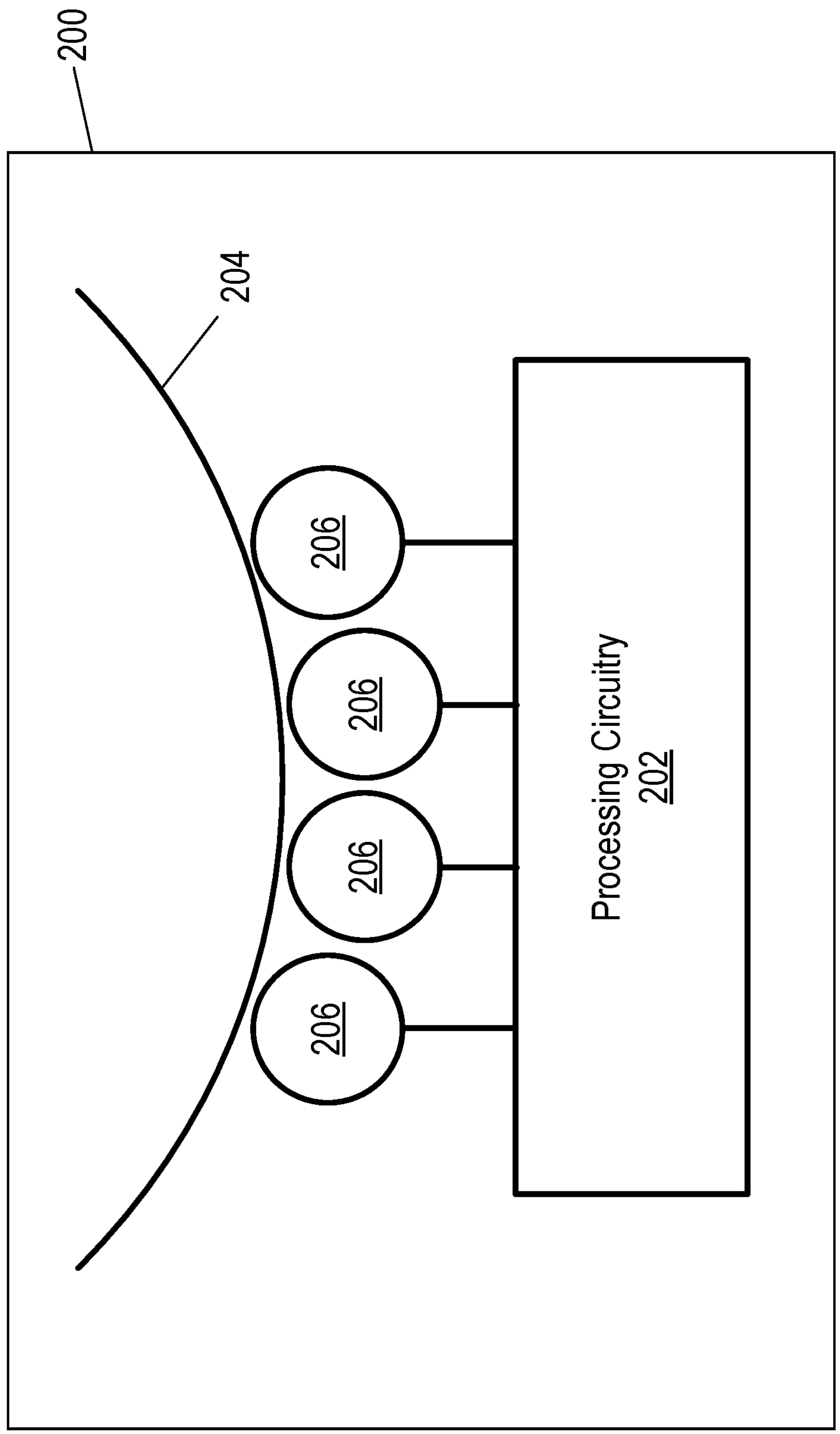
FIG. 2 is a schematic illustration of a further example of a print apparatus.

FIG. 2 is a schematic illustration of a further example of an apparatus 200 (e.g. a print apparatus). The print apparatus 200 is similar to the print apparatus 100 shown in FIG. 1; however, fewer components are shown in the apparatus 200. The print apparatus 200 comprises processing circuitry 202, a photoconductive surface 204 and a plurality of print components 206. The photoconductive surface 204 is to receive a latent image representative of an image to be printed onto a printable substrate. The photoconductive surface 204 may, for example, comprise the photoconductor 104 or a surface thereof. Each print component 206 of the plurality of print components has a surface movable relative to the photoconductive surface. According to various examples, the surface of a print component 206 may rotate relative to the photoconductive surface 204, the photoconductive surface may rotate relative to the surface of a print component, or the surface of a print component and the photoconductive surface may rotate relative to one another. A current or voltage is to be applied between print component surface and the photoconductive surface 204. For example, a current may be applied to none, one, some or all of the surfaces of the print components 206 and/or a voltage may be applied to none, one, some or all of the surfaces of the print components. In some examples, a current or a voltage may be applied to the photoconductive surface 204.

The processing circuitry 202 may comprise or be similar to the processor 102 shown in FIG. 1. The processing circuitry 202 is to measure a current or voltage between each print component surface and the photoconductive surface 204. Thus, a deviation from a constant current or voltage applied to the print component surface and/or the photoconductive surface 204, or a current or potential difference between the print component surface and the photoconductive surface can be detected. As noted above, in some examples, the surface of each print component 206 of the plurality of print components may comprise a surface of a developer roller of a print agent application assembly, a surface of an electrometer or a surface of a charge roller.

The processing circuitry 202 is to, responsive to detecting a deviation in the measured current or voltage from a reference current or voltage in respect of any of the plurality of print components, determine that there exists a defect associated with the photoconductive surface. In some examples, the reference current may comprise a baseline current and, similarly, the reference voltage may comprise a baseline voltage. In other words, the reference current or voltage for a print component 206 may comprise a baseline current or voltage applied between the surface of the print component and the photoconductive surface 204. A baseline current or voltage may, for example, comprise an average current or voltage measured over the photoconductive surface 204, or an average current or voltage measured at locations of the photoconductive surface where no defects exist. In other examples, the baseline current or voltage may comprise the current or voltage that is applied to the photoconductive surface 204. Since the photoconductive surface 204 is substantially uniform, a current or voltage between the photoconductive surface and a particular print component 206 at a location (e.g. a portion of the photoconductive surface adjacent to the particular print component) may measure a relatively constant current or voltage over the extent of the photoconductive surface when no defects associated with the photoconductive surface exist.

As discussed above, the photoconductive surface 204 may comprise an outer layer of a photoconductor (e.g. the photoconductor 104 of FIG. 1). In some examples, the defect may comprise one of: a contaminant located between the photoconductive surface 204 and an inner layer of the photoconductor; a scratch in the photoconductive surface; a contaminant on the surface of a print component or a scratch in the surface of a print component. For example, the soft-sub layer 108 make comprise an inner layer of the photoconductor, and the contaminant may become trapped between the photoconductive surface and an inner layer of the photoconductor (e.g. the soft-sub layer). If a contaminant were to become lodged beneath the photoconductive surface 204 (e.g. between the photoconductor 104 and the soft-sub layer 108 of FIG. 1) then a "bump" is formed on the photoconductive surface which, over time, may cause the photoconductive surface to abrade and expose a layer (e.g. an aluminum layer) beneath the surface. The structural change in the photoconductive surface 204 (e.g. the exposure of the aluminum layer) causes a reduction in the electrical resistance between the photoconductive surface and the surface of the print component 206, which leads to an increase in the current or voltage measured by the print component at the location of the defect. For example, a current flowing between the photoconductive surface 204 and the surface of a developer roller (110 of FIG. 1) of a BID may significantly increase as the developer roller engages or is adjacent the portion of the photoconductive surface where the defect is located. Such a deviation (e.g. a spike) in measured current or voltage can be indicative of the presence of a defect associated with the photoconductive surface 204. Similarly, a scratch in this photoconductive surface 204 may cause a deviation in the measured current or voltage. A contaminant or a scratch on the surface of a print component 206 may also lead to a deviation in the measured current or voltage between the print component and the photoconductive surface 204 and such a defect may be considered to be a defect associated with the photoconductive surface. A defect in respect of a print component 206 may, in some examples, be detected using a different print component of the plurality of print components.

The size of the deviation (e.g. the size of the spike) in the measured current or voltage relative to the reference current or voltage is indicative of the size of the defect associated with the photoconductive surface 204. Thus, the processing circuitry 202 is to determine, based on the amount of deviation of the measured current or voltage from the reference current or voltage, an indication of the size of the defect. In a general sense, a relatively larger deviation corresponds to a relatively larger defect. In some examples, the amount of deviation (e.g. the change in the current or voltage as the print component 206 encounters the defect on the photoconductive surface 204) may correspond directly to the size of the defect. Thus, not only can existing print components 206 of the print apparatus 200 be used to detect a potential defect (e.g. a scratch or a contaminant) associated with the photoconductive surface 204, but an indication of the size of the defect can also be determined. Furthermore, detection of potential defects can be achieved at a time when the print apparatus 200 is not performing a printing operation. For example, prior to performing a printing operation, the print apparatus 200 may perform a preparatory cycle, sometimes referred to as a "clear-wet cycle", during which the photoconductive surface 204 is electrostatically charged to around 900 volts (V) and each developer roller 206 (110 in FIG. 1) is charged to around 700 V. During this cycle, changes/spikes in the voltage occurring at particular locations of the photoconductive surface 204 may be detected by the developer rollers 206, and this may lead to the determination of the existence of a defect associated with the photoconductive surface.

Figure 3:
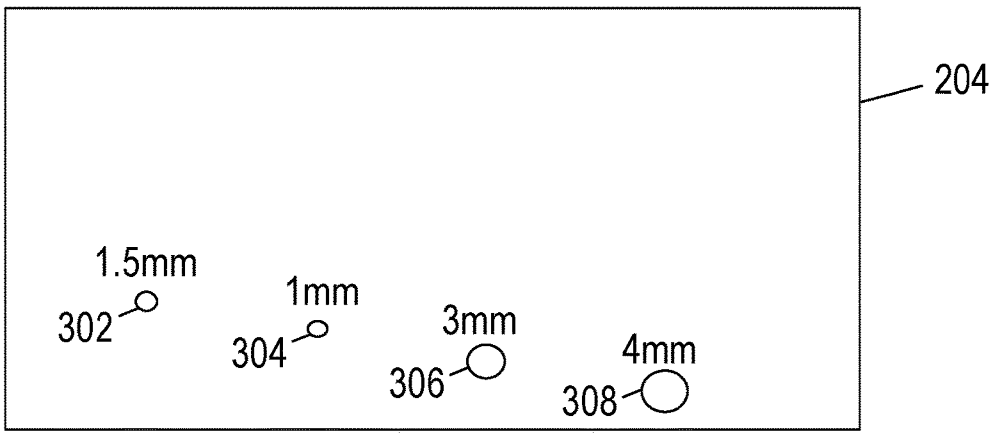
FIG. 3 is a graph showing an example of measured current over time.
Figure 3:
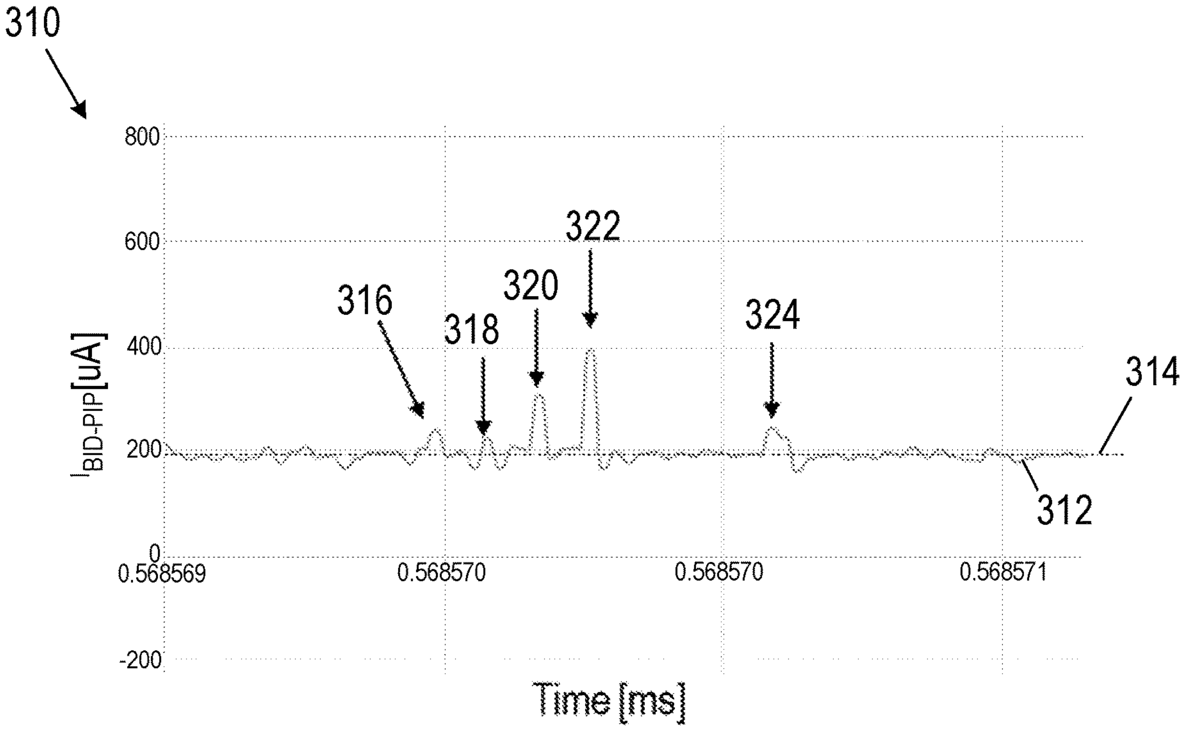

FIG. 3 shows an example of deviations (e.g. spikes) in a measured current, that correspond to defects of various sizes. In FIG. 3, the photoconductive surface 204 is shown to include defects 302, 304, 306, 308. In this example, all of the defects are shown to be approximately circular in shape; the defect 302 has a diameter of 1.5 millimeters (mm), the defect 304 has a diameter of 1 mm, the defect 306 has a diameter of 3 mm and the defect 308 has a diameter of 4 mm. A graph 310 shows how a measured current varies (line 312) over time, as the photoconductive surface 204 moves (e.g. as the PIP drum rotates) relative to the print component performing the measurement (e.g. a developer roller of a BID). A dashed line 314 represents an average current measured in respect of the photoconductive surface 204, and this line may be used as the baseline or reference current. A first peak 316 in the measured current appears at a location corresponding to the defect 302, a second peak 318 appears at a location corresponding to the defect 304, a third peak 320 appears at a location corresponding to the defect 306 and a fourth peak 322 appears at a location corresponding to the defect 308. The correspondence between the peaks in the measured current and the defects associated with the photoconductive surface 204 may be determined based on the relative rotation of the PIP drum. For example, the processing circuitry 202 may determine the relative rotation of a reference position on the photoconductive surface 204 and, the position of a current spike/peak relative to the reference position may be used to determine the corresponding location on the photoconductive surface.

The graph 310 also shows a peak 324 which is caused by a seam in the photoconductive surface (e.g. a seam or join in the photoconductor foil formed around the PIP drum). In some examples, such a seam may be used as the reference position on the photoconductive surface 204 for determining the relative position of a defect.

As shown in the graph 310 in FIG. 3, the size of each peak 316, 318, 320, 322 corresponds with the size of the respective defect that caused the peak. For example, the smallest peak (i.e. the second peak 318) corresponds to the smallest defect (i.e. the 1 mm defect 304), and the largest peak (i.e. the fourth peak 322) corresponds to the largest defect (i.e. the 4 mm defect 308).

Thus, based on the time at which the deviation (e.g. spike) in the measured current or voltage occurs, and with knowledge of the rotational position of the photoconductive surface 204, the processing circuitry 202 is able to determine the location on the photoconductive surface that corresponds to the deviation. Therefore, the processing circuitry 202 may determine, based on a time of the occurrence of the deviation with respect to the relative movement of the photoconductive surface 204, an indication of a location of the defect with respect to the photoconductive surface. Since the photoconductive surface 204 moves/rotates with respect to each print component 206, a point on the photoconductive surface will pass each print component once per complete revolution of the roller or drum on which the photoconductive surface is mounted. Therefore, each print component 206 will detect a deviation (e.g. a peak or spike) in the measured current or voltage each time it encounters the defect on the photoconductive surface 204. The frequency at which a deviation in the measured current or voltage occurs may also be used to determine the location of the defect relative to the photoconductive surface 204 more accurately. Each print component may rotate at a specific rotational speed and, therefore, has a specific associated frequency. A variation in current or voltage measured using a particular print component may occur at regular intervals corresponding to the frequency of the particular print component. The frequency of occurrence of the deviation can be monitored with respect to the photoconductive surface 204 and correlated with the specific rotational frequencies of the print components to see whether it matches. In the case where the defect is a defect of the print component, the defective print component may damage the photoconductive surface 204 if left. Therefore, by monitoring the rotational frequency of the print components and the frequency of any spikes/variations in the current or voltage, a defective print component can be detected, classified as defective, and repaired/replaced before further damage is caused.

An indication of the size of a defect associated with the photoconductive surface 204 can also be determined from the duration of a measured deviation in the current or voltage. For example, a relatively larger defect may cause a deviation for a relatively longer duration than a relatively smaller defect. Thus, the processing circuitry 202 may determine, based on a duration of the deviation as the print component 206 surfaces are moved relative to the photoconductive surface 204, an indication of the size of the defect. In some examples, an indication of the size of the defect may be determined based on both the duration of the deviation and the amount (e.g. amplitude or magnitude) of the deviation.

As can be seen from the line 314 shown in FIG. 3, the measured current or voltage baseline value varies slightly over time. Therefore, the measured current or voltage may be considered to deviate from the reference current or voltage (e.g. the baseline value or the average value indicated by the line 314) if the deviation meets or exceeds a defined threshold value. For example, if a measured voltage or current increases from the reference voltage or current by at least a threshold amount (e.g. 5%), then this increase may be considered to be a deviation and it may be determined that a defect exists. However, if the measured voltage or current increases from the reference voltage or current by less than the threshold amount (e.g. 5%), then the increase may be considered to be part of the fluctuating current or voltage measured over time. Thus, the processing circuitry 202 may, responsive to determining that the current or voltage measured in respect of each of the plurality of print components is within a defined threshold voltage of the reference current or voltage, determine that there is no defect associated with the photoconductive surface 204.

It will be clear from the above discussion that a single print component 206 may be used to detect a defect associated with the photoconductive surface 204. Since the print apparatus 200 of the present disclosure includes a plurality of print components 206, any defect associated with the photoconductive surface 204 may be detected by multiple print components. This can increase the confidence of the defect detection, and can help to reduce the chance of false positive detections occurring. Moreover, since different print components 206 (e.g. developer roller is 110, charge rollers 112 and electrometers 114) operate with different parameters and with different sensitivities, the confidence level associated with a defect detection made using one print component may be a greater than the confidence level associated with a defect detection made using another print component.

In some examples, a defect detection by a print component 206 may be verified an imaging device, such as the scanner 122 shown in FIG. 1. The print apparatus 200 may comprise a scanner 122 to scan the printable substrate having the image printed thereon. The scanner may, for example, comprise an in-line scanner (ILS). Such a scanner 122 may serve several purposes, including defect detection, substrate alignment, color checking, and the like. In some examples, the processing circuitry 202 may determine, from the scan, a location of a defect on the printable substrate 118 and a corresponding location of the defect with respect to the photoconductive surface 204. For example, the processing circuitry 202 may determine a distance of a print defect from a side edge of the printable substrate 118, and this distance may correspond to the distance between the side edge of the photoconductive surface 204 and the defect. In this way, an approximate location of the defect with respect to the photoconductive surface 204 can be determined. In some examples, the approximate location of the defect may be indicated to an operator, so that the operator can inspect the photoconductive surface 204 to rectify the defect (e.g. clean the photoconductive surface and/or remove any contaminant). Furthermore, a scanned image of the printable substrate 118 and the print defect on the printable substrate may be used to classify or characterize the defect. For example, image processing techniques or a human observer may be used to determine from the scanned image whether the print defect appears to be caused by a scratch or a contaminant under the photoconductive surface 204. In some examples, machine learning techniques (e.g. a trained artificial neural network) may be implemented to determine from the scanned image the nature of the defect.

The processing circuitry 202 may, in some examples, determine, from the scan, a location of the defect with respect to a print component 206. For example, a defect associated with the surface of one of the print components 206 may be detectable in an image printed on the printable substrate, and or on the photoconductive surface 204. The processing circuitry 202 may use the scanned image to classify the defect (e.g. determine whether the defect comprises a contaminant or a scratch).

Thus, in some examples, if, from the deviation in the measured current or voltage, the existence of a defect is suspected, then the processing circuitry 202 may trigger a scan of an image printed on the printable substrate to be acquired (e.g. using the scanner 122). The scanned image may be used to determine more accurately if a defect does exist, the type of defect and the position of the defect with respect to the photoconductive surface 204. Performing a scan can be expensive in terms of resources, so scans may be triggered just in cases where a defect is suspected.

In some examples, the photoconductive surface 204 may be housed within a housing of the print apparatus 200, such that inspection of a part of the photoconductive surface by an operator may be carried out when the part of the photoconductive surface is in an inspection position. For example, inspection of the photoconductive surface 204 may be restricted to just a portion at a time, for example through an inspection window. In the such examples, responsive to determining the existence of a defect, the processing circuitry 202 may operate a movement mechanism to move (e.g. rotate) the photoconductive surface into an inspection position such that the portion of the photoconductive surface containing the defect can be inspected by an operator.

Figure 4:
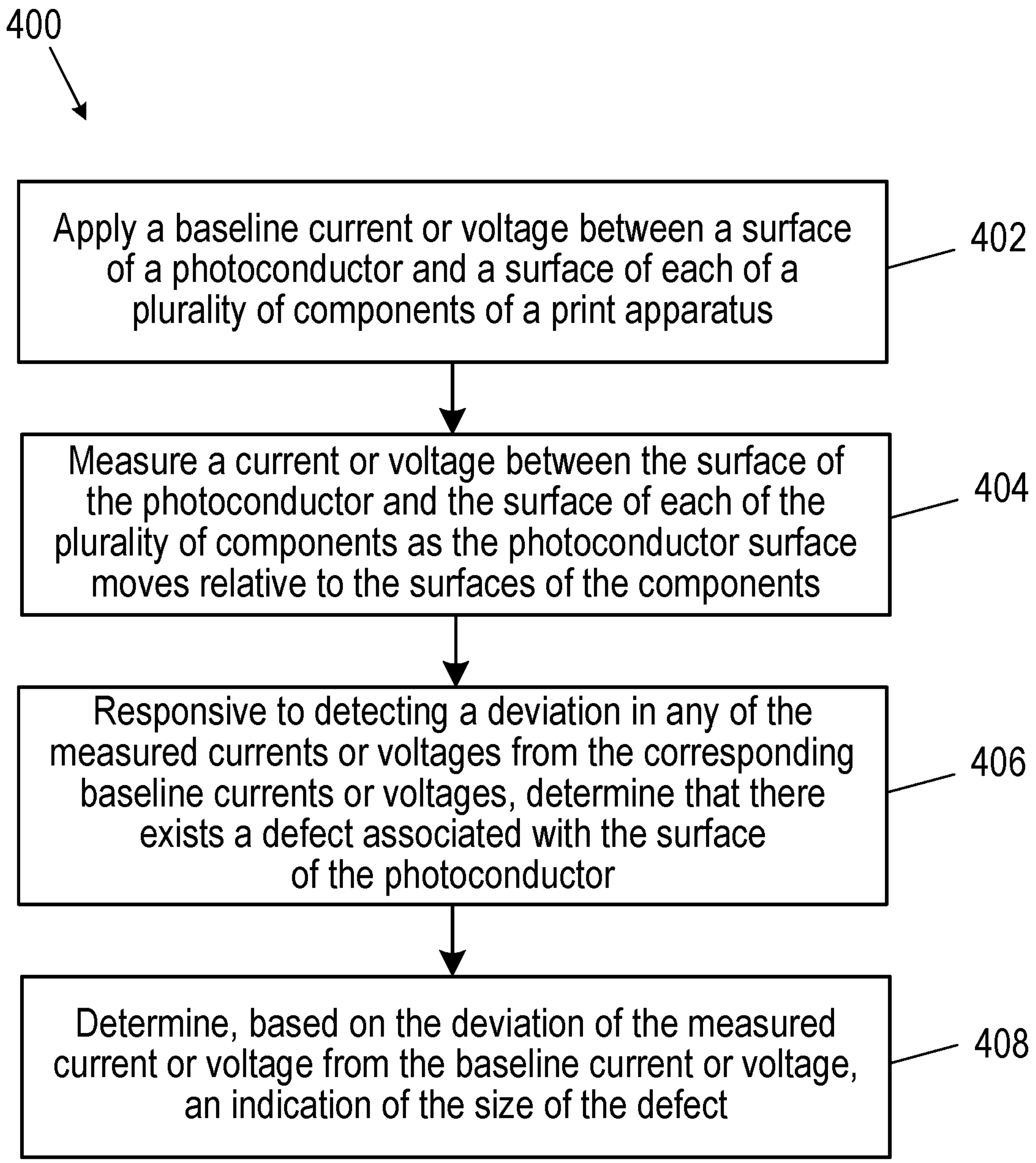
FIG. 4 is a flowchart of an example of a defect detection method.

The present disclosure also provides a method. FIG. 4 is a flowchart of an example of a method 400. The method 400, which may be referred to as a defect detection method, may be a computer-implemented method. The method 400 comprises, at block 402, applying a baseline current or voltage between a surface of a photoconductor 204 of a print apparatus and a surface of each of a plurality of components 206 of a print apparatus 200. The plurality of print components 206 may comprise a developer roller 110 (i.e. a print agent transfer roller), a charge roller 112 and/or an electrometer 114. At block 404, the method 400 comprises measuring a current or voltage between the surface of the photoconductor 204 and the surface of each of the plurality of components 206 as the photoconductor surface moves relative to the surfaces of the components. In some examples, the surface of the photoconductor 204 may rotate and/or the surface of each of the plurality of components 206 may rotate, such that the photoconductor surface and the print component surfaces rotate relative to one another. The method 400 comprises, at block 406, responsive to detecting a deviation in any of the measured currents or voltages from the corresponding baseline currents or voltages, determining that there exists a defect associated with the surface of the photoconductor. As discussed above, in some examples, a deviation below a defined threshold deviation may be ignored, such that the method determines the existence of a defect if the deviation meets or exceeds the defined threshold deviation. At block 408, the method 400 comprises determining, based on the deviation of the measured current or voltage from the baseline current or voltage, an indication of the size of the defect. For example, a relatively larger deviation may be caused by a relatively larger defect. A deviation may appear as a peak or a spike in a plot showing the measured current or voltage over time and, therefore, the amplitude of the peak or spike may correspond to the size of the defect causing the deviation.

Figure 5:
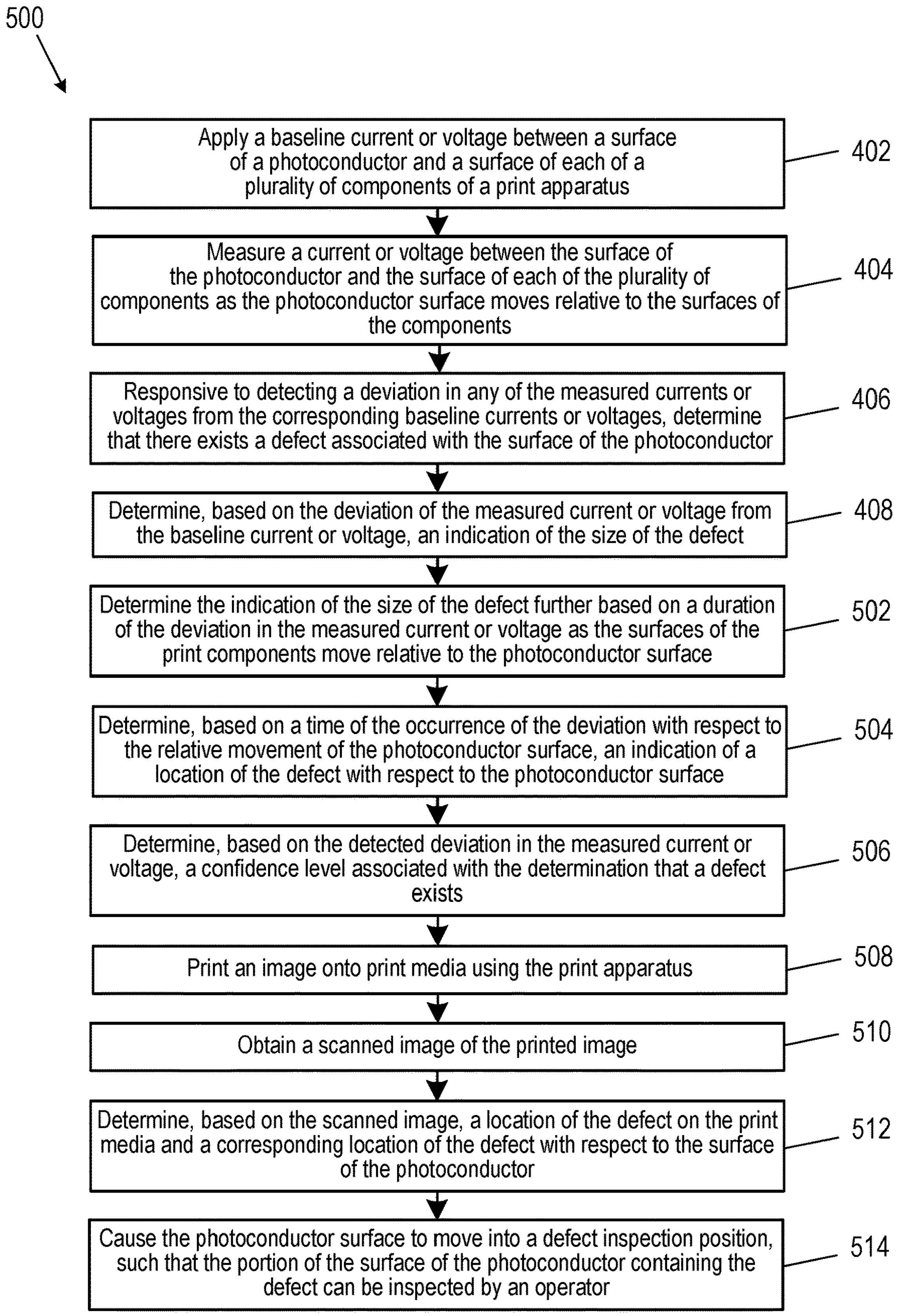
FIG. 5 is a flowchart of a further example of a defect detection method.

FIG. 5 is a flowchart of a further example 500 of a method. The method 500 (e.g. a defect detection method) may also be a computer implemented method. The method 500 may include a block or blocks of the method 400 discussed above.

As noted above, in addition to the amplitude of the peak or spike, the width (i.e. the duration) of the peak or spike may also provide an indication of the size of the defect, wherein a deviation occurring over a longer duration is determined to correspond to a relatively larger defect than a deviation occurring over a relatively shorter duration. Thus, the method 500 may comprise, at block 502, determining the indication of the size of the defect further based on a duration of the deviation in the measured current or voltage as the surfaces of the print components 206 move relative to the photoconductor surface 204.

In some examples, the method 500 may comprise, at block 504, determining, based on a time of the occurrence of the deviation with respect to the relative movement of the photoconductor surface 204, an indication of a location of the defect with respect to the photoconductor surface. That is to say, with knowledge of the movement (e.g. rotation) of the photoconductor surface 204 is possible to correlate the position of a peak or spike in current or voltage with a position (e.g. a rotational position on the photoconductor surface, such that the location of the defect that caused the deviation can be determined. Once a location of the defect has been determined with respect to the photoconductor surface 204, an operator may inspect the photoconductor surface at the appropriate location, to further investigate the defect. Thus, the photoconductor surface 204 may be moved into a defect inspection position, such that the portion of the surface of the photoconductor containing the defect can be inspected by an operator.

If a spike or deviation in the measured current or voltage is detected by just one print component 206 of the plurality of print components, then a level of confidence in the existence of a defect may be relatively low, particularly if the deviation appears just once (e.g. during one revolution of the print component and/or the photoconductor surface 204). However, if the spike or deviation occurs at regular intervals as the print component 206 and the photoconductor surface 204 rotate, or if multiple print components of the plurality of print components detect the deviation, then the level of confidence may be relatively higher. Similarly, a relatively larger spike or deviation may give rise to a greater level of confidence than a relatively smaller spike or deviation, which might be considered noise. In some examples, if the level of confidence that a defect exists is sufficiently high, then further investigation into the existence, size, location and nature of the defect may be warranted. Thus, in some examples, the method 500 may comprise, at block 506, determining, based on the detected deviation in the measured current or voltage, a confidence level associated with the determination that a defect exists.

The confidence level associated with the detection of a defect may be increased by viewing an image quality defect in a printed image resulting from the defect associated with the photoconductor surface 204. A printed image containing an image quality defect may also be used to determine a location (e.g. with respect to the width of the photoconductor surface 204) or nature (e.g. cause) of the defect. In some examples, therefore, responsive to determining that the confidence level exceeds a defined confidence threshold, the method 500 may comprise, at block 508, printing an image onto a print target (e.g. print media) using the print apparatus. The printed image may comprise a test image or calibration image. At block 510, the method 500 may comprise obtaining a scanned image of the printed image. For example, the scanned image may be obtained using the scanner 122. In some examples, an image may be printed onto print media using the print apparatus, and a scanned image may be acquired of the printed image regardless of the determined level of confidence. The method 500 may comprise, at block 512, determining, based on the scanned image, a location of the defect on the print media and a corresponding location of the defect with respect to the surface of the photoconductor. In some examples, the method 500 may comprise determining, based on the scanned image, the nature of the defect. For example, the defect may be classified as a scratch, a contaminant or any other defect.

In some examples, once the location of a defect has been determined on the photoconductor surface 204 (e.g. to a sufficient level of confidence, the method 500 may comprise, at block 514, causing the photoconductor surface 204 to move into a defect inspection position, such that the portion of the surface of the photoconductor containing the defect can be inspected by an operator. Once the photoconductor surface 204 has been moved into inspection position, the operator may perform a maintenance operation based on the defect type. For example, if the defect comprises a contaminant, the contaminant may be removed.

Figure 6:
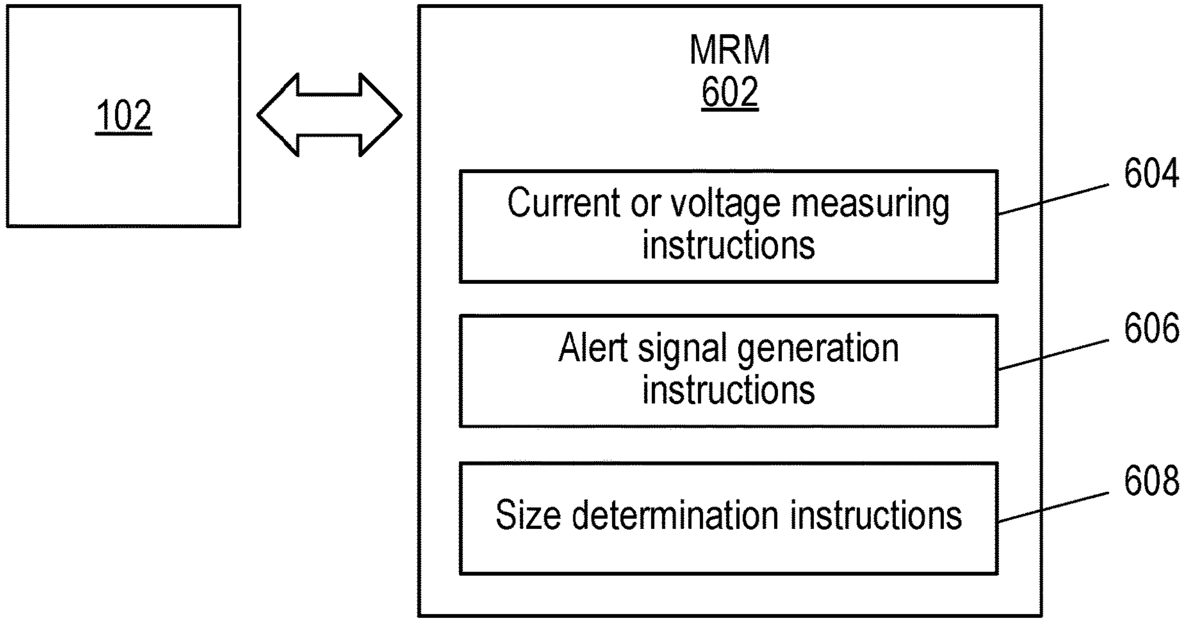
FIG. 6 is a schematic illustration of an example of a machine-readable medium in communication with a processor.

The methods 400, 500 or parts of the methods may be performed using a processor, such as the processor 102 or the processing circuitry 202 discussed herein. FIG. 6 is a schematic illustration of an example of the processor 102 in communication with a machine-readable medium 602. The machine-readable medium comprising instructions which, when executed by a processor, such as the processor 102, cause the processor to perform functions described in the methods 400, 500. In some examples, the machine-readable medium 602 comprises instructions (e.g. current or voltage measuring instructions 604) which, when executed by the processor 102, cause the processor to receive an indication of a measured current or a measured voltage between a photoconductive surface 204 and each of a plurality of surfaces adjacent to the photoconductive surface, as the adjacent surfaces move relative to the photoconductive surface. Each surface of the plurality of surfaces may comprise a surface of a print component 206. The machine-readable medium 602 further comprises instructions (e.g. alert signal generation instructions 606) which, when executed by the processor 102, cause the processor to, responsive to determining that the measured current varies from a reference current or the measured voltage varies from a reference voltage by more than a defined threshold amount, generate an alert signal indicating the existence of a defect associated with the photoconductive surface. The reference current may comprise a baseline current, such as the current applied to the photoconductive surface and/or the reference voltage may comprise a baseline voltage, such as the voltage applied to the photoconductive surface. In some examples, the reference current and/or the reference voltage may comprise an average current or voltage measured in on the photoconductive surface over a defined period of time. The machine-readable medium 602 further comprises instructions (e.g. size determination instructions 608) which, when executed by the processor 102, cause the processor to determine, based on an amount by which the measured current varies from a reference current or the measured voltage varies from the reference voltage, an indication of the size of the defect.

Examples disclosed herein provide a mechanism by which existing components of a print apparatus can be used to detect a potential defect associated with the photoconductive surface of the print apparatus and, further, to determine an indication of the size of the defect. This can be achieved at a time when the print apparatus is performing a preparatory operation, and which does not interfere with the printing operation. Therefore, productivity using the print apparatus is not affected. An effect of the disclosed examples is that a defect associated with the photoconductive surface can be detected, located and rectified easily, without replacement of components, such as the photoconductive surface. This can lead to an increase in print quality compared to the print quality if the defect were not rectified, and an increased lifespan of print apparatus components.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A print apparatus comprising:

a photoconductive surface to receive a latent image representative of an image to be printed onto a printable substrate;

a plurality of print components, each print component having a surface movable relative to the photoconductive surface, wherein a current or voltage is to be applied between the print component surface and the photoconductive surface;

a scanner to scan the printable substrate having the image printed thereon; and a processing circuitry to:

measure the current or voltage between each print component surface and the photoconductive surface;

responsive to detecting a deviation in the measured current or voltage from a reference current or voltage in respect of any of the plurality of print components, determine that there exists a defect associated with the photoconductive surface;

determine, based on an amount of the deviation of the measured current or voltage from the reference current or voltage, an indication of a size of the defect; and determine, from a scan of the printable substrate, a location of the defect on the printable substrate and a corresponding location of the defect with respect to the photoconductive surface.

2. A print apparatus according to claim 1, wherein the processing circuitry is to:

determine, based on a time of the occurrence of the deviation with respect to the relative movement of the photoconductive surface, an indication of a location of the defect with respect to the photoconductive surface.

3. A print apparatus according to claim 1, wherein the processing circuitry is to:

determine, based on a duration of the deviation as the print component surfaces are moved relative to the photoconductive surface, an indication of the size of the defect.

4. A print apparatus according to claim 1, wherein the processing circuitry is to:

responsive to determining that the current or voltage measured in respect of each of the plurality of print components is within a defined threshold voltage of the reference current or voltage, determine that there is no defect associated with the photoconductive surface.

5. A print apparatus according to claim 1, wherein the reference current or voltage for a print component comprises a baseline current or voltage applied between the surface of the print component and the photoconductive surface.

6. A print apparatus according to claim 1, wherein the photoconductive surface comprises an outer layer of a photoconductor; and wherein the defect comprises one of: a contaminant located between the photoconductive surface and an inner layer of the photoconductor; a scratch in the photoconductive surface; a contaminant on the surface of a print component; or a scratch in the surface of a print component.

7. A print apparatus according to claim 1, wherein the surface of each print component of the plurality of print components comprises a surface of a developer roller of a print agent application assembly, a surface of an electrometer or a surface of a charge roller.

8. A print apparatus according to claim 1, wherein, responsive to determining the existence of a defect, the processing circuitry is to:

operate a movement mechanism to move the photoconductive surface into an inspection position such that the portion of the photoconductive surface containing the defect can be inspected by an operator.

9. A defect detection method comprising:

applying a baseline current or voltage between a surface of a photoconductor of a print apparatus and a surface of each of a plurality of components of a print apparatus;

measuring a current or voltage between the surface of the photoconductor and the surface of each of the plurality of components as the photoconductor surface moves relative to the surfaces of the components;

responsive to detecting a deviation in any of the measured currents or voltages from the corresponding baseline currents or voltages, determining that there exists a defect associated with the surface of the photoconductor;

determining, based on the deviation of the measured current or voltage from the baseline current or voltage, an indication of a size of the defect; and determining, based on a scanned image, a location of the defect on a print media and a corresponding location of the defect with respect to the surface of the photoconductor.

10. A method according to claim 9, further comprising:

determining the indication of the size of the defect further based on a duration of the deviation in the measured current or voltage as the surfaces of the print components move relative to the photoconductor surface.

11. A method according to claim 9, further comprising:

determining, based on a time of the occurrence of the deviation with respect to the relative movement of the photoconductor surface, an indication of a location of the defect with respect to the photoconductor surface.

12. A method according to claim 9, wherein the scanned image is obtained by printing an image onto the print media using the print apparatus.

13. A method according to claim 9, further comprising:

determining, based on the detected deviation in the measured current or voltage, a confidence level associated with the determination that a defect exists;

responsive to determining that the confidence level exceeds a defined confidence threshold, printing an image onto print media using the print apparatus; and obtaining a scanned image of the printed image.

14. A machine-readable medium comprising instructions which, when executed by a processor, cause the processor to:

receive an indication of a measured current or a measured voltage between a photoconductive surface and each of a plurality of surfaces adjacent to the photoconductive surface, as the adjacent surfaces move relative to the photoconductive surface;

responsive to determining that the measured current varies from a reference current or the measured voltage varies from a reference voltage by more than a defined threshold amount, generate an alert signal indicating the existence of a defect associated with the photoconductive surface;

determine a location of the defect; and determine, based on an amount by which the measured current varies from a reference current or the measured voltage varies from the reference voltage, an indication of a size of the defect.

* * * * *